(12) United States Patent
Borggaard et al.

(10) Patent No.: US 10,145,947 B2
(45) Date of Patent: Dec. 4, 2018

(54) MAPPING POSITIONS OF DEVICES USING AUDIO

(71) Applicant: Google LLC, Mountain View, CA (US)

(72) Inventors: Geoffrey Allen Borggaard, Lincoln, MA (US); Daniel George Koulomzin, Jamaica Plain, MA (US); Christopher Richard Wren, Arlington, MA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/693,807

(22) Filed: Sep. 1, 2017

(65) Prior Publication Data

US 2017/0363726 A1   Dec. 21, 2017

Related U.S. Application Data

(62) Division of application No. 14/170,879, filed on Feb. 3, 2014, now Pat. No. 9,753,129.

(51) Int. Cl.
| | |
|---|---|
| *G01S 11/00* | (2006.01) |
| *G01S 11/14* | (2006.01) |
| *G01S 5/18* | (2006.01) |
| *G01S 5/30* | (2006.01) |
| *G01S 15/74* | (2006.01) |
| *G01S 5/02* | (2010.01) |

(52) U.S. Cl.
CPC ............... *G01S 11/14* (2013.01); *G01S 5/186* (2013.01); *G01S 5/30* (2013.01); *G01S 15/74* (2013.01); *G01S 5/0284* (2013.01)

(58) Field of Classification Search
CPC .................................. G01S 11/14; G01S 5/186
See application file for complete search history.

(56) References Cited

U.S. PATENT DOCUMENTS

| | | | |
|---|---|---|---|
| 3,789,353 A | 1/1974 | Hunter et al. | |
| 6,720,876 B1 | 4/2004 | Burgess | |
| 7,864,632 B2 * | 1/2011 | Pfaffinger | ................ H04S 7/00 367/124 |
| 8,243,961 B1 | 8/2012 | Morrill | |
| 2005/0058081 A1 | 3/2005 | Elliott | |

(Continued)

FOREIGN PATENT DOCUMENTS

| | | |
|---|---|---|
| CN | 1300042 A | 6/2001 |
| CN | 1576878 A | 2/2005 |

(Continued)

OTHER PUBLICATIONS

English Translation of Office Action dated Jul. 4, 2017 as received in CN Application No. 201580007008.3.
International Search Report and the Written Opinion for PCT/US2015/014073, dated May 8, 2015.
IPRP dated Aug. 18, 2016 as received in Application No. PCT/US2015/014073.

(Continued)

*Primary Examiner* — Hovhannes Baghdasaryan
(74) *Attorney, Agent, or Firm* — Shumaker & Sieffert, P.A.

(57) ABSTRACT

Disclosed are methods and systems for determining distance between two or more mobile devices utilizing a sound emitted from each device such as a chirp. Each device may determine or receive an indication of a time reference for each instance the device emits or detects a chirp. Utilizing the time reference data, the distance between the two or more devices may be determined assuming the sound travels at a constant speed of 340.29 m/s. Techniques for disambiguating orientation of the devices relative to one another rare also disclosed.

19 Claims, 5 Drawing Sheets

(56) References Cited

U.S. PATENT DOCUMENTS

| | | |
|---|---|---|
| 2005/0129139 A1 | 6/2005 | Jones et al. |
| 2006/0133556 A1 | 6/2006 | Sarkar |
| 2007/0014189 A1* | 1/2007 | Basilico .............. G01S 1/72 367/128 |
| 2008/0231498 A1 | 9/2008 | Menzer et al. |
| 2011/0222528 A1 | 9/2011 | Chen |
| 2012/0300814 A1 | 11/2012 | Schaffner |
| 2013/0083832 A1 | 4/2013 | Sorensen |
| 2013/0163382 A1 | 6/2013 | Millar et al. |
| 2014/0064034 A1 | 3/2014 | Zhang et al. |
| 2014/0073352 A1 | 3/2014 | Aldana et al. |
| 2015/0168536 A1* | 6/2015 | Banin .............. G01S 5/0205 455/456.2 |
| 2015/0195666 A1 | 7/2015 | Massey et al. |

FOREIGN PATENT DOCUMENTS

| | | |
|---|---|---|
| CN | 1835648 A | 9/2006 |
| CN | 103117064 A | 5/2013 |

OTHER PUBLICATIONS

Nagy, A, Time-based localisation in unsynchronized wireless LAN for industrial automation systems, ETFA, 2011 IEEE 16th Conference.

Office Action dated Jul. 4, 2017 as received in CN Application No. 201580007008.3.

Priyantha, "The Cricket Indoor Location System", Massachusetts Institute of Technology, Jun. 2005, 199 pp.

* cited by examiner

| Device 1<br>401 | Device 2<br>402 | Device 3<br>403 |
|---|---|---|
| Emits first chirp at time reference 1 or first indication | Emits second chirp at time reference 3 or the third indication | Emits third chirp at time reference 6 or sixth indication |
| Detects second chirp at time reference 2 or second indication | Detects first chirp at time reference 4 or fourth indication | Detects first chirp at time reference 7 or seventh indication |
| Detects third chirp at time reference 5 or fifth indication | Detects third chirp at time reference 8 or eighth indication | Detects second chirp at time reference 9 or ninth indication |

MAPPING POSITIONS OF DEVICES USING AUDIO

BACKGROUND

The speed of sound is generally constant assuming standard temperature and pressure at 340.29 m/s. A variety of techniques exist for utilizing audio to determine a position to an object. For example, sonar determines a range to an object by emitting one or more pulses of sound and listening for an echo. As another example, the distance between two locations may be estimated using ultrasonic and radio pulses in tandem, based upon the time difference in arrival between the audio chirp and the radio chirp, which travels at the speed of light.

BRIEF SUMMARY

According to an implementation of the disclosed subject matter, a system is provided that includes a first mobile device that is configured to emit a first chirp at a first time reference. The first mobile device may be configured to receive a first audio signal and detect a second chirp from a second mobile device at a second time reference within the first audio signal. It may obtain an indication of a first distance between the first mobile device and the second mobile device based on the first time reference, the second time reference, a third time reference, and a fourth time reference. The third time reference may correspond to when the second mobile device emits the second chirp and the fourth time reference may correspond to when the second mobile device receives the first chirp.

In an implementation, a first audio signal may be received from a first mobile device. A second audio signal may be received from a second mobile device. A first time reference corresponding to a first chirp from the first mobile device may be determined in the first audio signal. A second time reference corresponding to a second chirp from the second mobile device may be determined in the first audio signal. A third time reference corresponding to the first chirp from the second mobile device may be determined in the second audio signal. A fourth time reference corresponding to the second chirp from the second mobile device may be determined in the second audio signal. A first distance between the first chirp and the second chirp may be determined based on the first time reference and the second time reference. A second distance between the first chirp and the second chirp may be determined based on the third time reference and the fourth time reference. The first distance may be compared to the second distance. A distance calculation may be provided to the first mobile device and the second mobile device.

An advantage of the disclosed systems and methods is that the calculation can determine relative orientation of a plurality of devices. The disclosed implementations also provide a distance determination between two or more devices without custom hardware or additional hardware besides that which is typically included in a smartphone. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Disclosed is a way to determine the distance and orientation between two or more devices. As stated earlier, the speed of sound is generally constant. As an example, an application may be launched that coordinates the audio "chirp" for each device, devices A and B. The chirps may be similar in length and sound, and/or the chirps may be activated manually by a user controlling the device. Device A may receive an indication that it has emitted a chirp at time 0 or at sample 0 and receive device B's chirp at time 4.5 seconds later, i.e., 4.5 seconds after the first chirp is emitted by A. Device B may emit its chirp at time 0 and receive device A's chirp 1.5 seconds earlier, i.e., at a time −1.5 s relative to the time Device B emitted its chirp. By comparing the interval between chirps as detected by each device, the distance between the devices may be known. For example, the average between the two devices in this example is (4.5 s−−1.5 s)/2=3 s, which may be multiplied 340.29 meters/second to determine the distance between device A and device B. Devices A and B are approximately 1020 m apart in this example.

Digital audio may be sampled at one sample every $44,100^{th}$ of a second. In an implementation the speed of sound and digital sample rate may be used to determine a distance and/or orientation between two or more devices with an audio "chirp." Devices A and B may provide sample time indications instead of raw time as used in the above example. To illustrate, Device A may receive an indication that it has emitted a chirp at sample time 0 and it may receive Device B's chirp at sample time 1000. The sample time may refer to the number of samples in a digital audio stream. In this example, 1000 samples of the digital audio have been made between Device A's indication of a chirp and Device B's chirp being received by Device A. Device B may receive an indication that it has emitted a chirp at sample time 0 and it may have received or detected Device A's chirp at sample time −950, i.e., Device B sampled Device A's chirp 950 samples before it received an indication that Device B had emitted a chirp. To determine the distance between the devices, the sample interval, corresponding to the difference between when an indication of a chirp was received from a first device and the time at which a chirp was detected or received by a second device, may be determined. For Device A, the distance calculation is: (1,000 samples-0 samples)×1 sample/44,100 seconds×340 m/s=7.7 m. For Device B, the distance calculation is: (0 samples- −950 samples)×1 sample/44,100 seconds×340 m/s=7.3 m. The average between the two distance calculations may be utilized or one device's distance calculation may be used in lieu of another's. The use of sample times to determine time differences may be useful, for example, when a remote server or other third device calculates time differences and/or distances between devices. In this case, the remote server or other device may be provided only audio files that include or are believed to include one or more chirps, and an indication of the sample rate of the audio file, which often may be encoded or embedded within the audio file itself. The server thus may quickly determine time differences based upon the number of samples occurring between chirps, without the need for other devices to track separately the time at which chirps occur. Such a configuration also may allow for configurations in which devices other than the remote server or similar device detects chirps within audio samples, and the devices capturing the audio samples are not configured to perform chirp detection In the event that three devices are utilized, a relative orientation of the three devices may be determined. The three devices, for example, form the nodes of a triangle in space. The distance between device A and devices B and C may be 3 meters and 4 meters respectively. The distance between devices B and C may be 5 meters. Based on this information alone, however, it is unclear whether device C is to the "right" or "left" of device B relative to device A. Several methods are provided herein to determine the relative orientation of device C as compared to devices A and B. Devices B and C may be pointed at device A and directional data available to the devices, such as from built-in compass components, may be used to determine which direction they are pointed. As another example, a stereo microphone may be used to measure the difference in amplitude between the left and right channels to determine whether a device is to the left or the right of the receiving device. Similarly, a stereo microphone may be simulated by taking two or more measurements. For example, a first measurement may be made while pointing device C at device A. Device C may be moved slightly to the left or right and the process may be repeated. Distance calculations may be performed to determine relative orientation of Device C to Device A.

Figure 1:
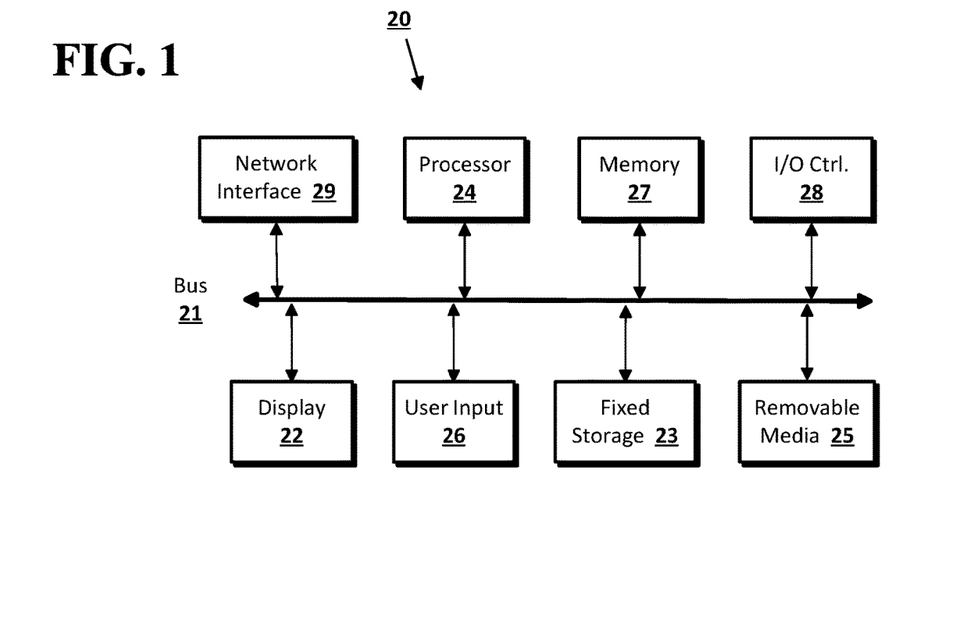
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
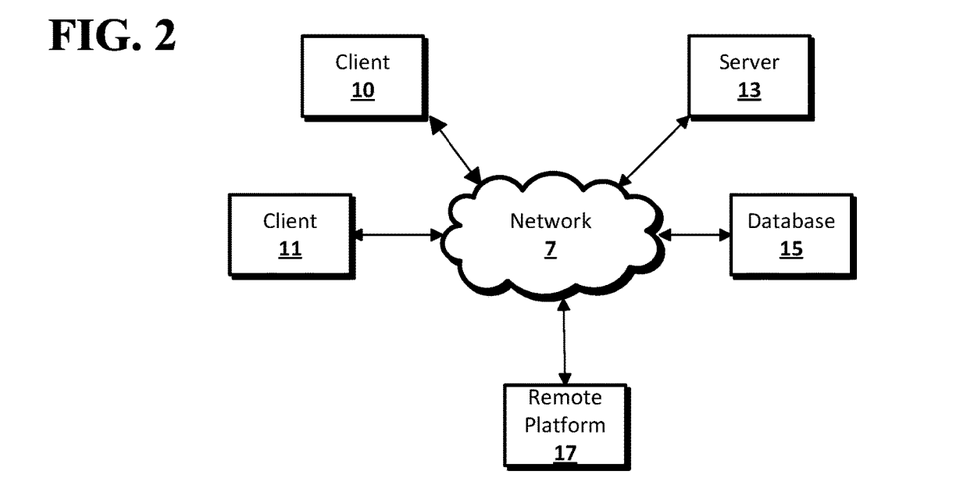
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
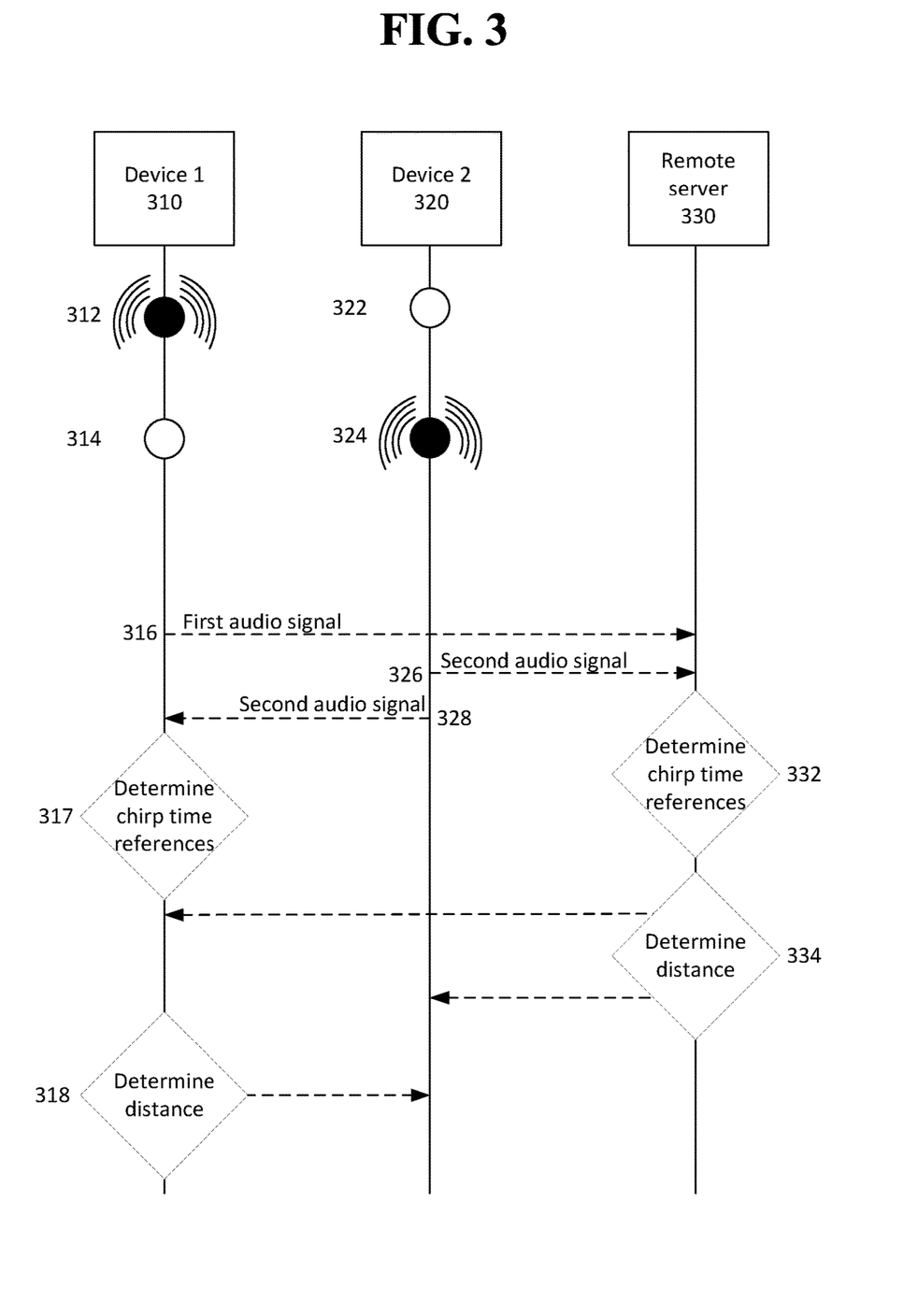
FIG. 3 is an example system for determining the distance between two or more device according to an implementation disclosed herein.

In an implementation, an example of which is provided in FIG. 3, a system is provided that includes a first mobile device 310. The mobile device 310 may be, for example, a smartphone, a tablet, or a laptop. The mobile device 310 includes at least a processor, a microphone, and a speaker. In some configurations, more than one microphone may be utilized to receive an audio signal. The first mobile device may be configured to emit a first chirp and receive a first indication of the first chirp at a first time reference 312. For example, the processor may note a raw time value or a sample time value that corresponds to when the chirp was emitted from the first device. In some configurations, the first mobile device may begin a counter once it emits the first chirp and stop the counter once it detects a chirp from the second device. Initialization of the counter may constitute receiving a first indication of the first chirp at a first time reference as disclosed herein. In some configurations, the mobile device may activate its microphone prior to emitting the first chirp. The audio recorded by the microphone may be analyzed, for example by the mobile device, to determine the timings of the first chirp and/or the second chirp. In such a configuration, the mobile device does not require clock synchronization with the device that emits the second chirp.

A chirp may refer to a brief audio pulse that, in some instances, can be repeated. A chirp may differ from another chirp (e.g., a first chirp and a second chirp) in at least one audio quality. An audio quality may refer to, for example, a frequency, a duration of chirp, and/or a pattern of chirp. In some cases, a "chirp" may refer to a repeated audio pulse of a specific type, a known fluctuation or variation in a continuous or semi-continuous audio signal, or the like.

A microphone on the first mobile device 310 may be utilized to receive a first audio signal. A second indication of a second chirp 324 from a second mobile device 320 at a second time reference may be received or detected within the first audio signal at 314. For example, the presence of the second chirp in the first audio signal may be detected and the second time reference corresponding thereto may be determined by the processor. An indication may be a signal to start recording an audio signal on the first mobile device in some configurations. If an application is coordinating the first mobile device and the second mobile device, the application may signal a start and stop time for sending and recording audio to both devices. Thus, the second time reference corresponding to the second chirp in the first audio signal may be separately determined from the third time reference corresponding to the second chirp in the second audio signal. For example, the first device may receive an indication that the second device has emitted the second chirp. A remote server may determine the time reference within the first audio signal at which the second chirp was received by the first device. As stated earlier, a time reference may refer to a raw time value (e.g., presented in seconds, minutes, etc.) or a sample time value corresponding to the number of digital samples taken during an interval of time. The sample time value may be converted to a raw time value as needed.

As an example, the first mobile device 310 and the second mobile device 320 may each operate an application that instructs the other device to emit a chirp or that automatically causes each device to emit a chirp. The application may coordinate the frequency, duration, pattern, and/or timing of the first and/or second chirps with each device involved or each device within a specified proximity that is concurrently operating the application. In some cases, a user may ping a friend or other user to activate the application by, for example, sending the other user a text, email, etc. The two mobile devices may communicate directly with one another, such as through the application, or they may not communicate further with one another and utilize a remote server for processing of the audio signals and/or chirp time reference data.

The first audio signal may be uploaded 316 to a remote server 330 for determination of the distance between the first chirp and the second chirp. The second mobile device 320 may also upload its audio signal 326 to the server 330 for processing. The remote server 330 may determine time references in each of the first audio signal and the second audio signal corresponding to each instance of a chirp being emitted or detected in the respective audio signals 332. The server may then provide an indication of the corresponding time references to the mobile devices or it may provide an indication of a distance between the first device and the second device.

Detecting the first chirp 312 and/or the second chirp 324 and/or the first time reference and/or second time references corresponding thereto in the first audio signal may be performed by the remote server by analyzing the first audio signal for a chirp. An indication of a time reference corresponding to when a chirp was made by a particular device may be sent to the server in lieu of having the server detect the time of when a chirp was emitted by the device. In some instances, the server may be made aware of a chirp's frequency, duration, approximate time it was made, or other audio qualities. For example, the first mobile device may transmit a message to the server when it emits the first chirp. In some instances, the server may direct a scan of an audio signal for a chirp in a particular frequency around a particular time. In instances where the server does not have information about the chirp, it may discern a chirp using pattern recognition software. In some configurations, the server may determine what constitutes background noises in an audio signal and filter out such sounds to determine the time reference of a given chirp.

As stated above, the speed of sound is constant assuming a standard temperature and pressure. Using the speed of sound, the sample rate for a digital audio signal, and the sample or time references of two chirps corresponding to when a chirp was emitted or received by either mobile device, the server may calculate the distance between two devices (e.g., the first mobile device and the second mobile device) 332. In some instances, the server may receive the second audio signal from the second mobile device. Thus, the server may be in communication with an application operating on each of the first mobile device and the second mobile device.

In some configurations, the first mobile device 310 may perform the calculation of the distance between itself and the second device using the first audio signal and/or the second audio signal from the second device 318. In such a configuration, the second mobile device may send the first mobile device, directly or indirectly, the second audio signal 328. The second audio signal may contain a third reference and a fourth reference that correspond to the time at which the second mobile device emits the second chirp 324 and the time at which the second mobile device 320 detects or receives an indication of the first chirp 322 from the first mobile device 310. In some configurations, the second device may perform some preprocessing of the second audio signal and may send a starting position for each of the chirps based on the pre-processing. Other devices may likewise perform such preprocessing and, for example, send starting positions of chirps detected in an audio signal to a server for a distance computation. Thus, in some configurations, the first mobile device may be configured to receive the third time reference and the fourth time reference, the second audio signal, and/or an indication of chirps detected or emitted in the second audio signal. The second mobile device 320 may be configured to send a third indication and a fourth indication of the third time reference and the fourth time reference, respectively, to the first mobile device or to a remote server. The third time reference may correspond to when the second mobile device emitted the second chirp or an indication thereof. The fourth time reference may correspond to when the second mobile device detected the first chirp within the second audio signal or received an indication thereof.

As described above, the first mobile device 310 or a remote server may determine the distance based on the first and second time references by themselves or in combination with the third and fourth time references 318. For example, the first distance may represent the average of the distances determined based on the first and second time reference and the third and fourth time references. The system may be configured to repeat the series of chirps from each device and distance determinations based on the chirps. The first distance may represent a minimum distance over a series of samples collected during repetition of the chirps and distance determinations based thereon. Thus, the distance between the first mobile device and the second mobile device may be calculated based on a minimum distance that is derived from two or more distance calculations between the two devices. Although theoretically the distances obtained from the respective time pairs from the two mobile devices should be identical, they may not be for technical reasons such as sound interference or microphone capabilities.

Whether the determination of the distance between the first mobile device 310 and the second mobile device 320 is performed locally, such as by the first mobile device 310, or remotely, such as by a server 330, the first mobile device may obtain an indication of a first distance between the first mobile device and the second mobile device. For example, a remote server 330 may transmit an indication of the first distance to the first mobile device and/or the second mobile device 334. As another example, the remote server may simply store the calculation of the first distance to a database and the first mobile device may query the database to obtain the indication of the first distance. If the first mobile device performs the distance calculation, it may transmit an indication of the distance to the second mobile device 318.

The example system in FIG. 3 may include the second mobile device. The second mobile device, as stated above, may emit the second chirp at the third time reference. A third indication of the third time reference may be received by the second mobile device. The indication may be, for example, a time stamp, sample time, or the like sent by the processor of the device or a start recording signal from an application on the device that is coordinating chirping as described above. The second mobile device may receive a second audio signal and detect, within the audio signal, the first chirp from the first mobile device or it may send the second audio signal to a remote server to detect the first chirp within the second audio signal. The server may send a fourth indication of the fourth time reference corresponding to when the first chirp was detected in the second audio signal. If an application is coordinating the first mobile device and the second mobile device, the application may signal a start and stop time for sending and recording audio to both devices. A determination of the third and/or fourth time reference corresponding to the second and first chirp respectively may be performed by the second mobile device or a remote server as described above. For example, remote server may determine the presence of the chirps within the second audio signal and correlate the detection of a chirp with a time reference. An indication of a time reference corresponding to when a chirp was emitted or detected may be sent by the server or received by one or more of the mobile devices. The second mobile device may receive the first time reference and the second time reference and determine the first distance. Likewise, the first mobile device may be configured to send the first time reference and the second time reference to the second mobile device. The second mobile device may obtain an indication of the first distance between the first mobile device and the second mobile device based on at least one of the first and second time references and/or the third fourth time references. For example, the second device may compute the average of the distances it calculates based on the first and second time references and the third and fourth time references.

The system depicted in FIG. 3 may include a server that may be configured to receive an indication of the first time reference, the second time reference, the third time reference, and the fourth time reference. As described earlier, the server may determine an indication of the first distance between the first mobile device and the second mobile device based on at least one of the first time reference and the second time reference and/or the third time reference and the fourth time reference. The server may provide an indication of the first distance to one or more devices which have requested the first distance and/or that have provided an audio signal such as the first mobile device and/or the second mobile device.

Figure 4:
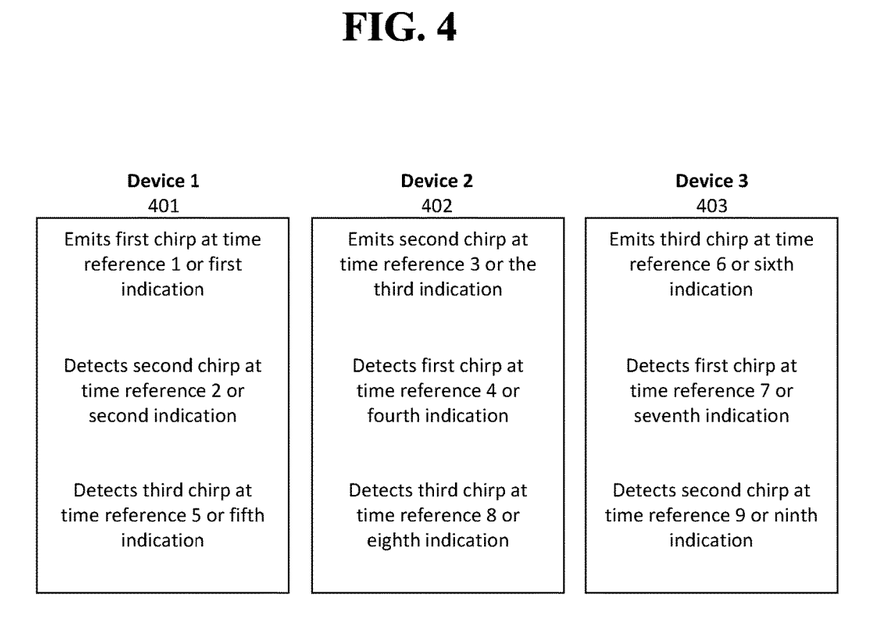
FIG. 4 is an example of how time references are associated with chirp detection or emission according to an implementation disclosed herein.

For clarity, FIG. 4 shows an example diagram of the time references associated with the chirps emitted and/or received by each of the first 401, second 402, and third mobile device 403 as disclosed herein. In an implementation, the first mobile device may be further configured to receive an indication of a third chirp from a third mobile device at a fifth time reference within the first audio signal. The first mobile device may receive an indication of a second distance corresponding to the distance between the first mobile device and the third mobile device. The second distance may be based on the first time reference and the fifth time reference and/or a sixth time reference and a seventh time reference. The sixth time reference may correspond to when the third mobile device emits the third chirp and the seventh time reference may correspond to when the third mobile device detects or receives the first chirp. Indications of the time references may be provided to the first mobile device, an application operating on the mobile devices that coordinates the chirping behavior of each mobile device, and/or a remote server.

In an implementation, the second mobile device may be configured to emit the second chirp from the second mobile device at the third time reference, receive a third indication of the second chirp at the third time reference, receive a second audio signal, and receive a fourth indication of the first chirp from the first mobile device at the fourth time reference within the second audio signal. An eighth indication of a third chirp from the third mobile device. The eighth indication may correspond to the eighth time reference as shown in FIG. 4. Detection of chirps and/or receipt of indications of time references, as described earlier, may be performed or provided by a remote server or on a given mobile device. The second mobile device may obtain an indication of the first distance between the first mobile device and the second mobile device based on the first time reference and the second time reference and/or the third time reference and the fourth time reference. It may obtain an indication of a third distance between the second mobile device and the third mobile device based on the third time reference and the eighth time reference and/or the sixth time reference and a ninth time reference. The ninth time reference may correspond to a time at which the third mobile device receives the second chirp or an indication thereof. The third mobile device may be configured to emit the third chirp from the third mobile device at the sixth time reference and receive a third audio signal. A sixth indication of the third chirp may be provided to the third mobile device. The indication may be, for example, the raw time value at which the chirp was emitted or the sample time value. The third mobile device may detect the first chirp from the first mobile device at the seventh time reference within the third audio signal and likewise detect the second chirp from the second mobile device at the ninth time reference. As described above, detection of chirps within the third audio signal may be performed by a remote server in lieu of a mobile device. The server may then return an indication of the time references to the mobile device and the mobile device may perform a distance calculation. The server may provide the distance calculation to the mobile device in lieu of providing the time references in some configurations.

The third mobile device may obtain an indication of the second distance between the first mobile device and the third mobile device based on the first time reference and the fifth time reference and/or the sixth time reference and the seventh time reference. It may obtain an indication of the third distance between the second mobile device and the third mobile device based on the third time reference and the eighth time reference and/or the sixth time reference and the ninth time reference.

In configurations in which three or more mobile devices are present, orientation of the devices may be determined using a variety of methods. In an implementation, the first mobile device is designated as a master device. Designation of a mobile device as a master device may be performed by random selection among devices that are within a threshold proximity to one another or by selecting the first device to execute an application that coordinates chirping from other proximal devices as the master device. Other techniques for selecting a master device are known in the art and may be compatible with the systems and methods disclosed herein. The second mobile and/or third mobile devices may be configured to receive an instruction to orient the device toward the master device. For example, if an application is coordinating the chirping of the first, second, and third mobile devices, the application may provide a notice to orient the device toward the master device. The master device may be identified in the notice by a phone number or user name, for example. The master device (e.g., the first mobile device) may receive an indication that the second mobile device and the third mobile device have been oriented toward it. For example, the application may receive compass data from the second and/or third mobile device to indicate an orientation of a device. An orientation of the second mobile device and third mobile device relative to the first mobile device may be determined based on, for example, compass data received from each of the second mobile device and the third mobile device.

Figure 6:
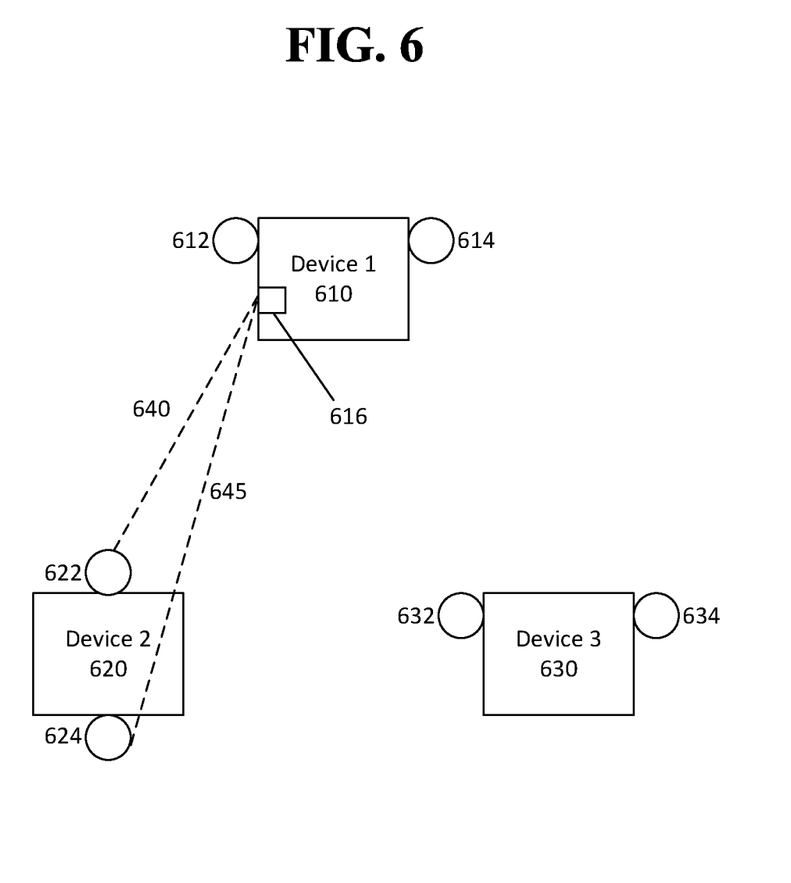
FIG. 6 is an example configuration of devices that may be used to determine orientation of one device relative to two other devices according to an implementation disclosed herein.

In an implementation, each of the first mobile device, the second mobile device, and the third mobile device may have at least two microphones. An audio signal may be received for each microphone on a device. In some cases, a single audio signal may contain the audio data from both microphones, but the audio data detected or received by each microphone may be separated out for each individual microphone (e.g., contained or encoded in discrete audio channels). As an example shown in FIG. 6, the first mobile 610 device may be configured to receive a fourth audio signal from a second microphone 614 on the first mobile device. In this example, the first audio signal may correspond to a first microphone 612 on the first mobile device 610. The first audio signal may be compared to the fourth audio signal by a server or by the first mobile device. If the server performs the comparison, it may receive the first and fourth audio signals from the first mobile device 610, or a single audio stream that contains audio data from both microphone 612, 614 on the first device 610. Likewise, the second 620 and third 630 audio devices may obtain audio signals for each microphone on the respective devices and may compare the audio signals or have a server perform the comparison of audio signals to determine a direction of a chirp. For example, the second mobile device 620 may obtain a fifth audio signal from a fourth microphone 624 on the second mobile device 620 (and the second audio signal may correspond to a third microphone 622 on the second mobile device 620). The third mobile device 630 may obtain a sixth audio signal from a sixth microphone 634 on the third mobile device 630 (and the third audio signal may correspond to a fifth microphone 632 on the third mobile device 630). A comparison of the fifth audio signal to the second audio signal and/or the sixth audio signal to the third audio signal may be performed by the second mobile device or third mobile device respectively or by a server. A comparison of between the audio detected by two microphones on a device may reveal, for example that a left oriented microphone detected a chirp from a device slightly before the right microphone detected the same chirp, indicating that the device from which the chirp was emitted was left of the device detecting the chirp. For example, Device 1's speaker 616 may emit a chirp that is detected by Device 2's two microphones 622, 624. The distance traveled by sound emitted from device 1's speaker 616 would be different as detected by device 2's two microphones 622, 624 due to the position of those microphones on Device 2 620, as indicated by the two dashed lines 640, 645. The first mobile device may receive an indication of orientation of the first mobile device relative to the second mobile device and the third mobile device based on the comparison of the first audio signal to the fourth audio signal. The second and third mobile devices may receive indications of their positions relative to the first and third mobile devices or first and second mobile devices respectively. Thus, the orientation of each mobile device in the system may be determined.

In an implementation, the first mobile device may be configured to receive an indication that the first mobile device has been rotated a predetermined number of degrees in a known direction. It may emit a fourth chirp and obtain an indication of a fourth distance between the first mobile device and the third mobile device based on the fourth chirp and an indication of a fifth distance between the second mobile device and the third mobile device based on the fourth chirp. The indication of the fourth distance may be compared to that of second distance and indication of the fifth distance may be compared to that of the third distance. A relative orientation of the third mobile device to the first mobile device and the second mobile device based on the comparison may be determined. For example, compass data from the first device may be utilized to determine the direction of rotation of the first device. Distance calculations subsequent to the rotation of the first mobile device may reveal slight changes in the distances between the first device and the second and third mobile devices respectively. If the location of the microphone on the first mobile device is known, the combination of distance calculations, compass information, and microphone location may be used to determine the relative orientation of the second and third mobile with to the first mobile device. In some cases, conventional triangulation techniques may be used to determine a location and/or rotation of the third device.

Figure 5:
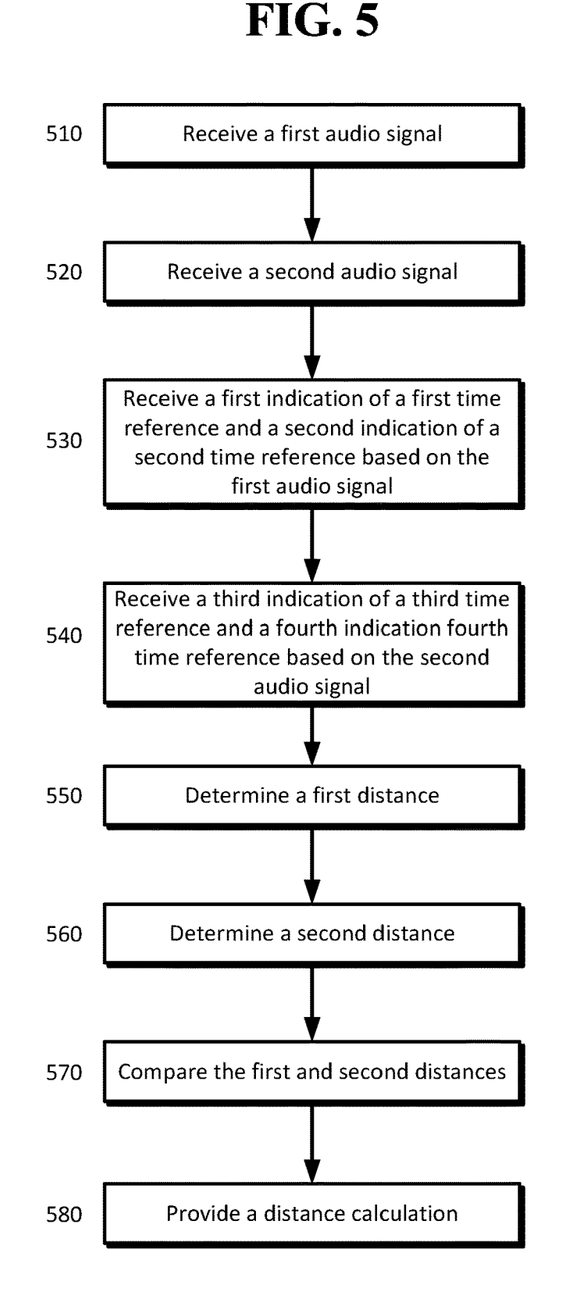
FIG. 5 is an example method for determining the distance between two or more devices as disclosed herein.

In an implementation, an example of which is provided in FIG. 5, a first audio signal may be received, for example by a server, from a first mobile device at 510. A second audio signal from a second mobile device may be received at 520. A first indication of a first time reference corresponding to a first chirp from the first mobile device and a second time reference corresponding to a second chirp from the second mobile device in the first audio signal may be received at 530. A third indication of a third time reference corresponding to the first chirp from the first mobile device and a fourth indication of a fourth time reference corresponding to the second chirp from the second mobile device in the second audio signal may be received at 540.

As an example, the first mobile device may emit a chirp in response to a user activating an application configured to coordinate chirping. An indication that the chirp has been emitted may be sent to the first mobile device and/or to a server in communication with the first mobile device. The second mobile device may emit a second chirp and a second indication that the chirp has been emitted by the second mobile device may be sent to the second mobile device, the first mobile device (as a, and/or the server. Each mobile device may record an audio signal using a microphone on the respective devices. After a predefined time period, a signal to stop recording, a user-based action to cause recording to cease, the first audio signal from the first device and the second audio signal from the second device may be analyzed to ascertain time references corresponding to when each device received or heard the other device's chirp. Thus, an indication of the time at which a first device emits a chirp may be received by a server and the time at which the first device detects or receives a second device's chirp based on an analysis of the audio signal may be determined by the server. Similarly, the second device's audio signal may be provided to the server for a determination of the time (e.g., sample time or raw time) at which it detected the first device's chirp. The server may perform a distance calculation based on the time references indicating to when the first and second devices emitted their respective chirps and the time references indicating when the first and second devices detected a chirp from the other device.

A first distance between two devices based on the first chirp and the second chirp may be determined based on the first time reference and the second time reference at 550. A second distance between the first chirp and the second chirp may be determined based on the third time reference and the fourth time reference at 560. The first distance may be compared to the second distance at 570. A server may provide an average between the first distance and the second distance as a distance calculation. The server may randomly or otherwise select one of the first distance or the second distance as the distance calculation if for example, the two distances are sufficiently close (e.g., the two distances do not deviate by more than 10%). A distance calculation may be provided to the first mobile device and the second mobile device at 580. In some configurations, the server may provide the first distance calculation to the second mobile device and the second distance calculation may be provided to the first mobile device. Each device may average the distance calculation obtained from another device. For example the first device may obtain the first distance and receive the second distance from the server. The first device may then average the second distance with the first distance. Generally, the first distance and second distance will be close. If however, the first distance and the second distance are too dissimilar, the server, for example, may direct each device to repeat the chirp process beginning at 510 in FIG. 5. The distance between the first mobile device and the second mobile device may be calculated based on a minimum distance that is derived from two or more distance calculations between the two devices. It may include, for example, the first distance and the second distance. A minimum distance may be provided, for example, as the distance between the two devices based on one or more repetitions of the process shown in FIG. 5 in some configurations.

In some configurations, a third audio signal may be received from a third mobile device. For example, the third mobile device may communicate the third audio signal to a remote server. A series of time references may be determined in the audio signals that have been received, including a fifth time reference corresponding to a third chirp from the third mobile device, a sixth time reference corresponding to the third chirp from the third mobile device in the third audio signal, a seventh time reference corresponding to the first chirp from the first mobile device in the third audio signal, an eighth time reference corresponding to the third chirp from the third mobile device in the second audio signal, and a ninth time reference corresponding to the second chirp from the second mobile device in the third audio signal. As stated earlier, the aforementioned determinations may be performed by the first mobile device or a remote server, for example.

Time determinations (e.g., sample time or raw time as described earlier) obtained from the various audio signals may be utilized to perform distance calculations based on the detection of a chirp and an assumption of between two or more devices as described substantially above. A third distance between the first mobile device and the third mobile device may be determined based on the first time reference, the fifth time reference, the sixth time reference, and the seventh time reference. A fourth distance between the second mobile device and the third mobile device may be determined based on the third time reference, the eighth time reference, the sixth time reference, and the ninth time reference. As described above, one of the mobile devices (e.g., the first mobile device) may be designated as a master device using a number of selection methods known in the art (e.g., random selection, etc.).

An orientation of three or more devices relative to one another may be determined based on techniques disclosed earlier. For example, an indication that the first mobile device has been rotated a predetermined number of degrees in a known direction (e.g., based on compass data) may be received. A fourth chirp may be detected in each of the first audio signal, second audio signal, and third audio signal. Distance calculations may be performed using a time reference obtained for the fourth chirp in each of the audio signals. The distance calculations post-rotation of the device may be compared to the corresponding distance calculation pre-rotation of the device. For example, a fifth distance between the first mobile device and the third mobile device may be determined using time references obtained for the fourth chirp in the first audio signal and the third audio signal. The fifth distance may be compared to the third distance. As described earlier, distance calculations subsequent to the rotation of the first mobile device may reveal slight changes in the distances between the first device and the second and third mobile devices respectively. The combination of distance calculations, compass information, and microphone location may inform the orientation of the second and third mobile devices relative to the first mobile device.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
   receiving, by a remote server and from a first mobile device, a first audio signal, the first audio signal including an indication of a first time reference corresponding to a first chirp from the first mobile device and an indication of a second time reference corresponding to a second chirp from a second mobile device, wherein a clock of the first mobile device is not synchronized with a clock of the second mobile device;
   receiving, by the remote server and from the second mobile device, the second audio signal, the second audio signal including an indication of a third time reference corresponding to the second chirp from the second mobile device and an indication of a fourth time reference corresponding to the first chirp from the first mobile device;
   determining, by the remote server and based on the first time reference and the third time reference, a first distance between the first chirp and the second chirp;
   determining, by the remote server and based on the second time reference and the fourth time reference, a second distance between the first chirp and the second chirp; and
   determining, by the remote server and based on the first distance to the second distance, a distance between the first mobile device and the second mobile device.

2. The method of claim 1, wherein determining the distance between the first mobile device and the second mobile device comprises determining an average of the first distance and the second distance.

3. The method of claim 1, wherein determining the distance between the first mobile device and the second mobile device is based on a minimum distance selected from a plurality of distance calculations, the plurality of distance calculations including the first distance and the second distance.

4. The method of claim 1, wherein the first chirp and the second chirp differ in at least one audio quality.

5. The method of claim 4, wherein the at least one audio quality is one or more of: a frequency, a duration of chirp, or a pattern of chirp.

6. The method of claim 1,
   wherein the first audio signal further includes an indication of a fifth time reference corresponding to a third chirp from a third mobile device, and
   wherein the second audio signal further includes an eighth time reference corresponding to the third chirp from the third mobile device,
   the method further comprising:
      receiving, by the remote server and from a third mobile device, a third audio signal, the third audio signal including an indication of a sixth time reference corresponding to the third chirp from the third mobile device, an indication of a seventh time reference corresponding to the first chirp from the first mobile device, and an indication of a ninth time reference corresponding to the second chirp from the second mobile device; and
      determining, by the remote server, a distance between the first mobile device and the third mobile device based on the first time reference, the fifth time reference, the sixth time reference, and the seventh time reference.

7. The method of claim 6, further comprising determining, by the remote server, a distance between the second mobile device and the third mobile device based on the fourth time reference, the eighth time reference, the sixth time reference, and the ninth time reference.

8. The method of claim 7, further comprising designating the first mobile device as a master device.

9. The method of claim 8, further comprising:
   receiving, from the second mobile device, first compass data;
   receiving, from the third mobile device, second compass data;
   determining, based on the first compass data, an orientation of the second mobile device relative to the master device;
   determining, based on the second compass data, an orientation of the third mobile device relative to the master device; and
   determining, based on the orientation of the second mobile device and the orientation of the third mobile device, a relative position of each of the second and third devices relative to the master device.

10. The method of claim 6, wherein each of the first mobile device, the second mobile device, and the third mobile device include at least two microphones.

11. The method of claim 6, further comprising:
receiving, by the remote server, a fourth audio signal from a second microphone on the first mobile device, wherein the first audio signal corresponds to a first microphone on the first mobile device; and
determining, by the remote server and based on the first audio signal and the fourth audio signal, a direction toward which the first mobile device points relative to the second mobile device and the third mobile device.

12. The method of claim 11, further comprising:
obtaining, by the remote server, a fifth audio signal from a second microphone on the second mobile device, wherein the second audio signal corresponds to a first microphone on the second mobile device;
determining, by the remote server and based on the second audio signal and the fifth audio signal, a direction toward which the second mobile device points relative to the first mobile device and the third mobile device;
obtaining, by the remote server, a sixth audio signal from a second microphone on the third mobile device, wherein the third audio signal corresponds to a first microphone on the third mobile device; and
determining, by the remote server and based on the third audio signal and the sixth audio signal, a direction toward which the third mobile device points relative to the first mobile device and the second mobile device.

13. The method of claim 6,
wherein each of the first audio signal, the second audio signal, and the third audio signal includes a respective indication of a fourth chirp, and
wherein the distance between the first mobile device and the first mobile device is a first distance between the first mobile device and the third mobile device,
the method further comprising:
receiving an indication that the first mobile device has been rotated a predetermined number of degrees in a known direction;
determining, by the remote server, a second distance between the first mobile device and the third mobile device based on the respective indications of the fourth chirp included in the first audio signal and the third audio signal;
determining, by the remote server, a second distance between the second mobile device and the third mobile device based on the respective indications of the fourth chirp included in the second audio signal and the third audio signal; and
determining, by the remote server, a relative orientation of the third mobile device to the first mobile device and the second mobile device based on the first distance between the first mobile device and the third mobile device, the second distance between the first mobile device and the third mobile device, the first distance between the second mobile device and the third mobile device, and the second distanced between the second mobile device and the third mobile device.

14. The method of claim 1, wherein receiving the first indication of the first time reference corresponding to the first chirp comprises initialization of a counter.

15. The method of claim 6, further comprising activating, by the third mobile device and before emitting the third chirp, a microphone.

16. The method of claim 9, wherein the compass data is from a built-in compass component.

17. The method of claim 10, wherein a first of the at least two microphones is disposed on a first side of a corresponding mobile device and a second of the at least two microphones is disposed on a second side of the corresponding mobile device, the first side opposite of the second side.

18. The method of claim 13, wherein the indication that the first mobile device has been rotated the predetermined number of degrees in the known direction is from a built-in compass component.

19. A non-transitory computer-readable medium storing computer code for controlling a processor of a remote server to cause the processor of the remote server to:
receive, from a first mobile device, a first audio signal, the first audio signal including an indication of a first time reference corresponding to a first chirp from the first mobile device and an indication of a second time reference corresponding to a second chip from a second mobile device, wherein a clock of the first mobile device is not synchronized with a clock of the second mobile device;
receive, from the second mobile device, the second audio signal, the second audio signal including an indication of a third time reference corresponding to the second chirp from the second mobile device and an indication of a fourth time reference corresponding to the first chip from the first mobile device;
determine, based on the first time reference and the third time reference, a first distance between the first chirp and the second chirp;
determine, based on the second time reference and the fourth time reference, a second distance between the first chirp and the second chirp; and
determine, based on the first distance to the second distance, a distance between the first mobile device and the second mobile device.

* * * * *